(12) United States Patent
Jacobson et al.

(10) Patent No.: US 9,384,359 B2
(45) Date of Patent: Jul. 5, 2016

(54) INFORMATION FIREWALL

(71) Applicant: Palo Alto Research Center Incorporated, Palo Alto, CA (US)

(72) Inventors: Van L. Jacobson, Woodside, CA (US); Rebecca Lynn Braynard Silberstein, Sunnyvale, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 88 days.

(21) Appl. No.: 13/957,271

(22) Filed: Aug. 1, 2013

(65) Prior Publication Data
US 2015/0040180 A1 Feb. 5, 2015

(51) Int. Cl.
*G06F 21/00* (2013.01)
*G06F 21/62* (2013.01)
*H04L 29/06* (2006.01)
*G06F 21/85* (2013.01)

(52) U.S. Cl.
CPC .............. *G06F 21/62* (2013.01); *G06F 21/85* (2013.01); *H04L 63/0227* (2013.01); *H04L 63/0245* (2013.01); *H04L 63/08* (2013.01); *H04L 63/0861* (2013.01); *H04L 63/0876* (2013.01); *H04L 63/10* (2013.01); *G06F 2221/2137* (2013.01); *H04L 63/101* (2013.01)

(58) Field of Classification Search
CPC ......... H04L 63/02; H04L 63/08; H04L 63/10; G06F 2221/2113; G06F 2221/2141
USPC ................ 726/1–30; 713/164–167, 182–188; 709/217–229
See application file for complete search history.

(56) References Cited

U.S. PATENT DOCUMENTS

| | | | | |
|---|---|---|---|---|
| 8,117,441 | B2 * | 2/2012 | Kurien et al. | 713/164 |
| 8,312,064 | B1 * | 11/2012 | Gauvin | 707/822 |
| 8,458,462 | B1 * | 6/2013 | Hanna | H04L 63/10 |
| | | | | 713/156 |
| 8,863,227 | B2 * | 10/2014 | Zhang | G06F 21/10 |
| | | | | 713/171 |
| 2007/0209067 | A1 * | 9/2007 | Fogel | 726/11 |
| 2012/0159176 | A1 * | 6/2012 | Ravindran | H04L 63/104 |
| | | | | 713/176 |
| 2012/0291102 | A1 * | 11/2012 | Cohen | 726/4 |
| 2012/0317613 | A1 * | 12/2012 | Kim | H04L 63/10 |
| | | | | 726/1 |

(Continued)

OTHER PUBLICATIONS

Carofiglio, Giovanna, et al. "Modeling data transfer in content-centric networking." Proceedings of the 23rd international teletraffic congress. International Teletraffic Congress, 2011.*

(Continued)

*Primary Examiner* — Madhuri Herzog
(74) *Attorney, Agent, or Firm* — Shun Yao; Park, Vaughan, Fleming & Dowler LLP

(57) ABSTRACT

A data-firewall system blocks sensitive data from becoming available outside a protected space. During operation, the system can obtain an interest from a requesting entity. The requesting entity can include, for example, a software application running on a local computer, a computing device of an Enterprise environment, or a computing node of a computer cluster. Also, the interest can include a location-independent structured name associated one or more data items. When the system obtains the data associated with the location-independent structured name, the system proceeds to obtain a policy associated with the data, and to determine a context for the interest. Then, if the system determines that the requesting entity is within a protected space, as determined based on the policy and the context, the system forwards the data to the requesting entity.

24 Claims, 7 Drawing Sheets

(56) References Cited

U.S. PATENT DOCUMENTS

2014/0282816 A1* 9/2014 Xie et al. ............................ 726/1
2014/0289790 A1* 9/2014 Wilson ............................... 726/1

OTHER PUBLICATIONS

Choi, Jaeyoung, et al. "A survey on content-oriented networking for efficient content delivery." Communications Magazine, IEEE 49.3 (2011): 121-127.*

* cited by examiner

INFORMATION FIREWALL

BACKGROUND

1. Field

This disclosure is generally related to an information firewall. More specifically, this disclosure is related to using contextual information to protect data from being accessed by unintended recipients.

2. Related Art

Malicious users typically steal sensitive data by breaking into computer systems, either online or locally, which gives them access to the sensitive information on these systems. For example, a malicious user may impersonate a legitimate user by stealing his credentials, and may use these credentials to gain access to the user's computer. Other malicious users may snoop on a secured wireless network over an extended period of time to crack the network's wireless access key. Once the access key has been cracked, the malicious user can gain access to devices within the wireless network, such as network-attached storage devices.

Unfortunately, once a malicious user breaks into a computer or storage device, the user typically has full access to all data on the hacked device. To safeguard sensitive data against a break-in, some users employ an additional level of security by encrypting files that are deemed to be sensitive, such as financial documents and account information. Doing so prevents a user from accessing the plaintext data if the user does not provide the necessary password for decrypting the file. However, encrypting individual files to safeguard data is not a popular solution because it requires the user to enter the password each time the user desires to open an encrypted file.

SUMMARY

One embodiment provides a data-firewall system that blocks sensitive data from becoming available outside a protected space. During operation, the system can obtain an interest from a requesting entity. The requesting entity can include, for example, a software application running on a local computer, a computing device of an Enterprise environment, or a computing node of a computer cluster. Also, the interest can include a location-independent structured name associated one or more data items. When the system obtains the data associated with the location-independent structured name, the system proceeds to obtain a policy associated with the data, and to determine a context for the interest. Then, if the system determines that the requesting entity is within a protected space, as determined based on the policy and the context, the system forwards the data to the requesting entity.

In some embodiments, in response to determining that the requesting entity is not within the protected space, the system requests for an authorization from the requesting entity.

In some embodiments, in response to determining that the interest is associated with a blacklisted namespace, the system blocks the data from being forwarded to the requesting entity.

In some embodiments, the system can determine that the requesting entity is within a protected space when the requesting entity is a trusted computing device, the requesting entity is a trusted software application, and/or the requesting entity is coupled to a trusted computer network. The system can also determine that the requesting entity is within a protected space when the context satisfies the policy's rules. Further, the system can determine that the requesting entity is within a protected space when a recent behavior profile for the requesting entity, as determined based in part on the context, is substantially similar to a previous behavior profile for the requesting entity.

In some embodiments, the system can generate a policy for a protected space. The system selects a namespace for which to control access, and determines one or more entities which have been provisioned for the protected space. The system determines a network topology for the determined entities, and determines one or more interfaces to authorize for the selected namespace. The system then generates a policy which authorizes access to the selected namespace, for the provisioned entities, and via the determined interfaces.

In some embodiments, the context includes one or more of: a hardware identifier; a network address; a biometric measurement; a location identifier; a location trace; a user behavior; a network behavior; and an interest-related behavior.

In some embodiments, while obtaining the data associated with the location-independent structured name, the system obtains the data from a local repository, and/or forwards the interest to a remote computing device based on the location-independent structured name.

BRIEF DESCRIPTION OF THE FIGURES

In the figures, like reference numerals refer to the same figure elements.

DETAILED DESCRIPTION

Figure 1:
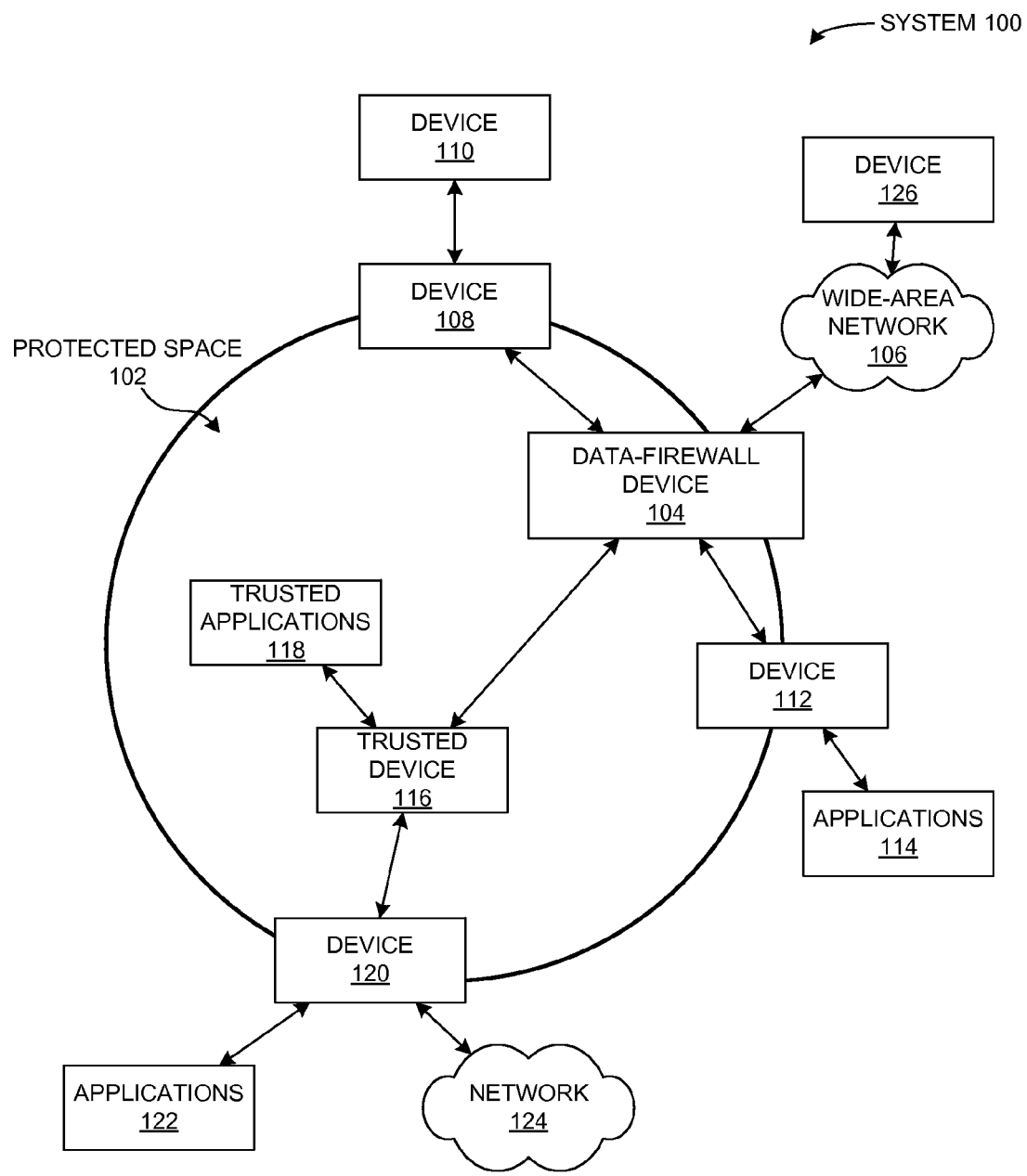
FIG. 1 illustrates an exemplary computing environment that includes a protected space in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a data-firewall system that solves the problem of preventing data from being accessed from outside a protected space. The protected space can include one or more computing devices and/or software environments that are trusted entities, and are allowed to access data associated with the protected space. For example, if the protected space includes one or more computers and software applications provisioned for a company's enterprise environment, data that is meant to be accessed only from the protected space may only be accessed by these provisioned devices and applications.

Also, if a device becomes compromised, the device may restrict access to data that should not be accessed from outside the protected space. For example, if the device is lost, stolen, or has been accessed illegitimately, the device may detect that the usage behavior of the device has changed, and may perform a remedial action that secures the protected data. The remedial action can include blocking access to the protected data, and/or requiring the local user or an administrative user to provide authentication information to unblock access to the protected data.

As an example, the system can access and disseminate content using content-centric networking (CCN), and uses filters and policies to block protected data from being forwarded to devices that are not within a "protected space." The protected space can include devices and applications that are trusted entities, and which are not suspected of having been compromised by an illegitimate user or software.

In CCN, all content is named, and each piece of content is uniquely bound to its location-independent structured name. Multiple names can be securely bound to a piece of content through the use of CCN Links, and multiple content objects can be considered a collection based on a namespace and the published content. A description of a CCN is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference. When the system generates a structured name for a content item, the system binds the meaningful name to the content (along with additional information) to form a content object that can satisfy various interests from other nodes in the network. For example, these structured names allow other entities to obtain the content item via CCN, and to add the content item to their local data collection.

In a CCN, content objects are "persistent," which means that the content item can move around within a computing device, or across different computing devices, but does not change. If any component of the content object changes, the entity that made the change creates the updated content, additional information or the name, and/or a new content object, and signs the new content (e.g., to bind a new name to the content). A structured name can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" of "/parc/home/ccn/test.txt." Additional components can be used to distinguish between different versions of the content item, such as a collaborative document. These additional naming components are not the focus of this invention. The naming scheme can be modeled as a forest of trees, and there is no single "root" for the naming scheme. The system can create a set of structured names for the content item to create "links" between the content item and other sets of names for other content items. In CCN, these links are also content objects that securely bind names to existing or future content objects. Additional naming structures can also be developed, for example, a content object can be created that contains a list of names linking to other content objects.

Because of this naming convention, the content item can be addressed, located, retrieved, cached, and disseminated by its structured name(s). Any entity in a computer network, such as a computing device or software application, can generate an interest to obtain the content from any device that has a content item whose structured name satisfies the interest. However, in embodiments of the present invention, a content item is only forwarded to the requesting entity that disseminated the interest if the requesting entity belongs to a "protected space" for the content item.

FIG. 1 illustrates an exemplary computing environment that includes a protected space 102 in accordance with an embodiment. Protected space 102 can include one or more trusted entities that are allowed to access data associated with protected space 102. The trusted entities can include computing devices that have been provisioned to access protected data, and/or can include software environments (e.g., software applications and/or operating systems) with privileges for accessing the protected data. For example, the trusted entities can be affiliated with a computer cluster (e.g., servers and/or virtualization environments provisioned for protected space 102), an enterprise environment, or a user's personal computing device.

In some embodiments, devices on the perimeter of protected space 102 (e.g., devices 104, 108, 112, and 120) are configured to enforce filters and/or policies that restrict access to the protected data. Devices securely within protected space 102 (e.g., trusted device 116) can provide access to the protected data without evaluating the filters and/or policies that govern access to the protected data.

Protected space 102 can include a data-firewall device 104 (e.g., a network router or firewall device) that prevents protected data within a local-area network (LAN) from flowing to an untrusted device 126 via a wide-area network 106. Device 104 can receive interests for data from within the LAN (e.g., protected space 102) and from WAN 106, and uses a set of filters and/or policies to determine whether the requesting entity that submitted the interest is within the protected space. The requesting entity can include a computing device, or can include a software environment within a computing device. If the requesting entity is within the protected space (e.g., trusted device 116), device 104 can forward the requested data to the requesting entity. On the other hand, if the requesting entity is not within the protected space (e.g., device 126), data-firewall device 112 can block the requested data from being forwarded to the requesting entity. For example, a malicious user or a computer worm may install malicious executable code in device 112 to steal data. If this malicious code generates the interest to obtain sensitive data, device 112 or device 104 will not satisfy the interest by allowing the sensitive data to flow back to device 112 or to the malicious code.

Protected space 102 can also include trusted devices that have been configured to operate securely within the trusted space, and are allowed to access the protected data without evaluating the filters and/or policies that govern access to the protected data. A system administrator can configure trusted device 116 to only communicate with other devices within protected space 102, and the system administrator may install only applications that are deemed safe for protected space 102. If a user wishes to install other applications and/or to interface trusted device 116 to other devices (e.g., device 120), the system administrator can configure these applications and/or devices to operate safely within protected space 102.

For example, the system administrator can configure a device 120, such as a personal smartphone or laptop computer, to operate within protected space by configuring device 120 to prevent protected data from being accessed by illegitimate entities (e.g., by enforcing rules), and/or by configuring device 120 to block access to protected data (e.g., by enforcing the filters). If device 120 receives an interest for protected data from trusted device 116, device 120 can determine that trusted device 116 is within the protected space based on the policies that govern access to the protected data. However, if device 120 receives the interest from untrusted applications 122, or from a requesting entity via an untrusted network 124, device 120 can process the policies to determine that the requesting entity is not within protected space 102, and blocks the requested data from being forwarded to the requesting entity.

In some embodiments, the system administrator can configure a device within protected space 102 (e.g., device 108 or device 122) to process the filters and/or policies if the device no longer satisfies a security profile. For example, the trusted device may include a security profile that indicates a set of trusted devices and/or applications that the trusted device can interface with. However, if a user configures device 108 to interface with an unknown device 110, such as by coupling a smartphone to device 108 via a local connection (e.g., a universal serial bus (USB) connection) device 108 can analyze its security profile to determine whether device 110 is a trusted device. If device 110 is not a trusted device, then device 108 is no longer securely within protected space 102, and device 108 configures itself to enforce the filters and/or policies for protected space 102. Similarly, if a user installs untrusted applications 114 into device 112, then device 112 is no longer securely within protected space 102, and device 112 configures itself to enforce the filters and/or policies for protected space 102.

Figure 2:
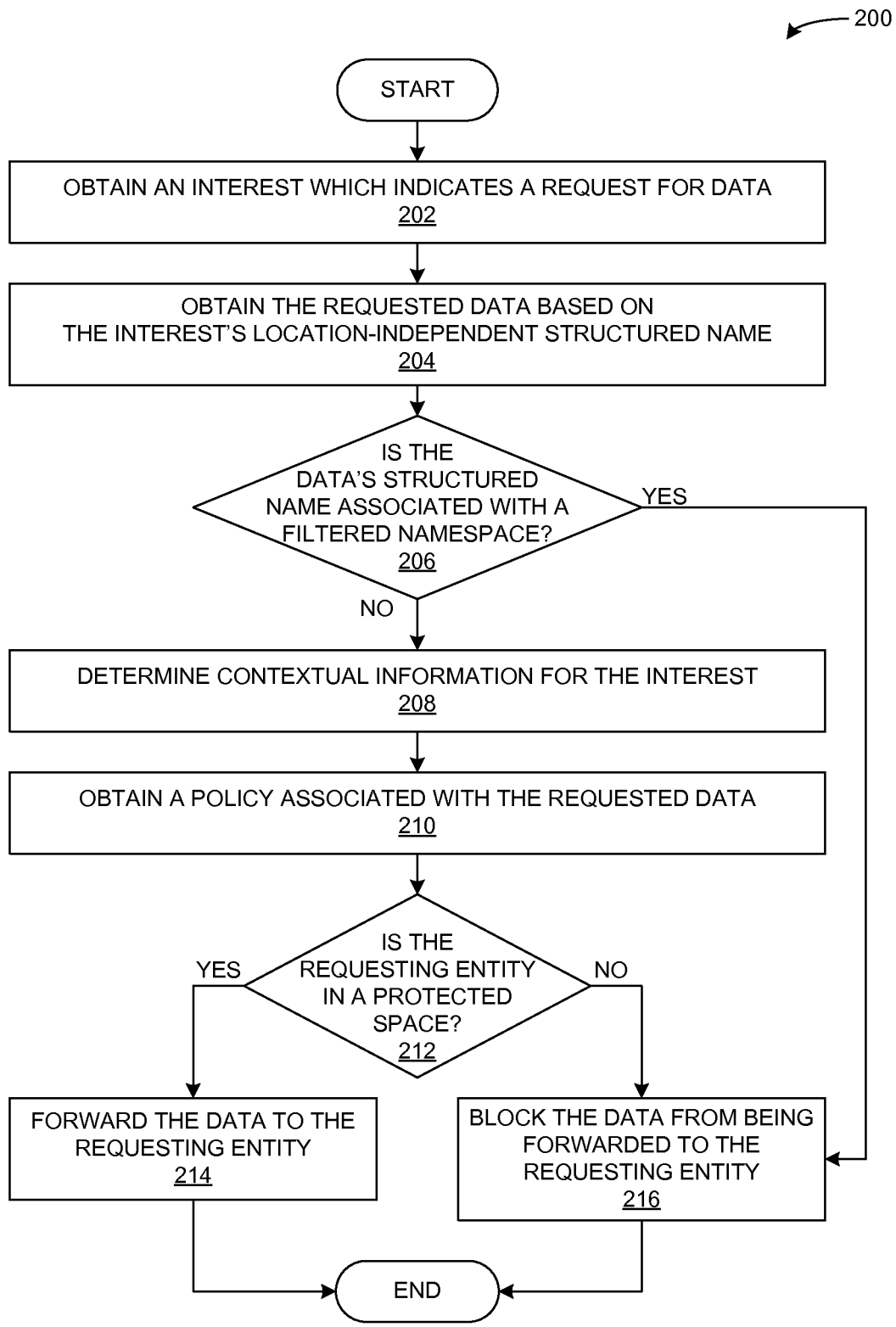
FIG. 2 presents a flow chart illustrating a method for securing data within a protected space in accordance with an embodiment.

FIG. 2 presents a flow chart illustrating a method 200 for securing data within a protected space in accordance with an embodiment. During operation, the system can obtain an interest which indicates a request for data (operation 202). The interest can include a location-independent structured name. The system can obtain the interest from a local software environment (e.g., a software application, or a local virtualization environment), or from a remote computing device (e.g., a router, a networked computer, etc.).

The system can process the interest to obtain data whose name is associated with the location-independent structured name (operation 204). Recall that multiple content items can be associated with the interest's location-independent structured name. The interest's structured name can indicate a namespace for an organization (e.g., "/parc"), for a data collection (e.g., "/parc/projects/alpha"), or for a specific file (e.g., "/parc/projects/alpha/description.doc"). The system can process the various data items that are associated with the interest individually, and determines which data items it can forward to the requesting entity. For example, the system can determine whether a data item needs to be protected (e.g., based on a filter and/or a policy), and determines whether the requesting entity is within a protected space from which the data item can be accessed.

To protect the data item, the system can determine whether the data's structured name is associated with a filtered namespace (operation 206). If so, the system blocks the data item from being forwarded to the requested entity (operation 216). Otherwise, if the data is not to be filtered, the system determines contextual information for the interest (operation 208), and obtains a policy associated with the requested data (operation 210).

The system then determines whether the requesting entity is within a trusted space (operation 212), by processing the policy's rules based on the contextual information. If the requesting entity is within a protected space, the system forwards the data to the requesting entity (operation 214). Otherwise, if the requesting entity is not within a protected space, the system blocks the data from being forwarded to the requesting entity (operation 216), or performs a remedial action (e.g., requesting authentication information from the user or the requesting entity).

In some embodiments, the rules may cause the system to determine, for example, whether the requesting entity is a trusted computing device, or is a trusted software application in a trusted computing device. As another example, the rules can cause the system to determine whether the requesting entity is coupled to a trusted computer network, and/or resides within a trusted location (e.g., the owner's home, workplace, or any other location associated with the requesting entity).

In some embodiments, the system can monitor the contextual information for the interests it receives, and can maintain behavior profiles for the interests and/or for the requesting entities from which it receives the interests. The rules can include a condition that an interest's context is in accordance with a behavior profile associated with the interest or for the requesting entity that provided the interest. The system can evaluate this profile condition by determining whether a recent behavior profile for the requesting entity is substantially similar to a previous behavior profile for the requesting entity. To determine whether the two behavior profiles are similar, the system can compute a Euclidian distance over a plurality of profile attributes, or can compute the distance using any other distance metric now known or later developed.

If the recent behavior profile is too different from a previous behavior profile, it is possible that the system has been compromised, and either an undesired user or a malware application may be using the requesting entity to perform a malicious activity. Hence, if the recent behavior profile is too different from a previous behavior profile, the system can determine that the requesting entity is not within a protected space, and can block the data from being forwarded to the requesting entity.

Figure 3:
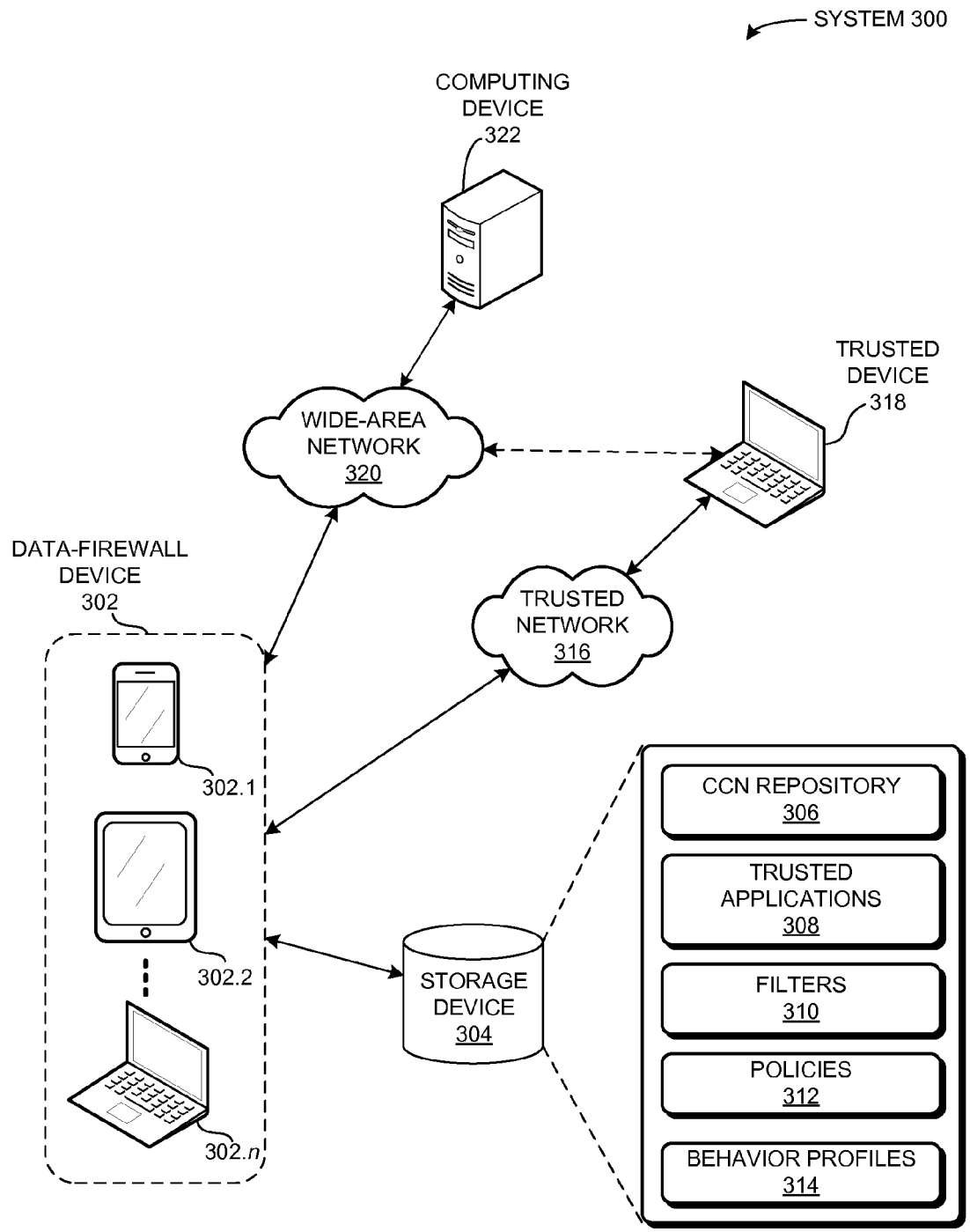
FIG. 3 presents an exemplary computer system that enforces filters and policies for a protected space in accordance with an embodiment.

FIG. 3 presents an exemplary computer system 300 that enforces filters and policies for a protected space in accordance with an embodiment. Computer system 300 can include a data-firewall device 302, such as a smartphone 302.1, a tablet computer 302.2, or a computing device 302.$n$ (e.g., a laptop, or a server computer). Data-firewall device 302 can include a storage device that stores a CCN repository 306, trusted applications 308, filters 310, policies 312, and behavior profiles 314.

In some embodiments, CCN repository 306 can store data associated with location-independent structured names. CCN repository 306 can store the data in encrypted form, which prevents an untrusted entity from accessing the data directly from CCN repository 306. To access the data, the requesting entity needs to provide an interest for the data to device 302, at which point a trusted application on device 302 processes the interest. The trusted application (e.g., a repository-managing application) can decrypt the data if the requesting entity is associated with a protected space for the requested data.

For example, when device 302 receives an interest from the requesting entity, device 302 can use a location-independent structured name from the interest to search for matching content items within CCN repository 306. If at least a subset of a content item's structured name matches that of the interest's structured name, device 302 can obtain the content item for the requesting entity.

However, before forwarding the content item to the requesting entity, device 302 can determine whether the requesting entity is within a trusted space for the content item. Device 302 can use filters 310 to determine whether the content item belongs to a namespace that is not to be forwarded. Also, device 302 can collect contextual information associated with the interest and/or the requesting entity, and can process the contextual information using policies 312 to determine whether the requesting entity is within the content item's protected space.

In some embodiments, the requesting entity can include a software application or environment within device 302, such as a trusted application 308. When device 302 receives the interest from the software application, device 302 can collect contextual information such as a name or identifier for the software application, permission information for the software application or its software environment, access credentials for a user of the software environment, permission information for the user, a biometric scan for the user, a user profile for the user, etc. Device 302 can also obtain other contextual information associated with the runtime environment for the software, such as network-addressing information for device 302, identifiers for hardware and/or software modules of device 302 accessible by the software application, a physical location for device 302 (e.g., geographic positioning system (GPS) coordinates, or a location name), etc.

Device 302 can use this contextual information to update a behavior profile associated with the requesting entity (e.g., stored in behavior profiles 314). This updated behavior profile accounts for behavior information derived from the collected contextual information, such as to account for the requesting entity's data-access behavior, network-usage behavior, activity times, etc. Device 302 processes the collected contextual information and/or behavior profiles using policies 312 to determine whether the software application is within a protected space. Device 302 blocks access to the data for applications that are not within the protected space will, such as a computer worm, a virus, or an untrusted user application. Device 302 blocks access to the data for a trusted user application when the application's contextual information raises a suspicion that device 302 may have been compromised.

For example, the policy for a company's protected space may indicate that the requesting entity needs to be coupled to trusted network 316, and needs to reside either at the company's facilities or within the user's home. Hence, when device 302 receives an interest from a trusted application, device 302 can forward the data (e.g., from CCN repository 306) to the trusted application if the user is operating device 302 within the company's facilities and coupled to trusted network 316. Device 302 can also forward the data to the trusted application if the user is operating device 302 within his home, and device 302 is coupled to a virtual private network (VPN) session to trusted network 316.

In some embodiments, the requesting entity can include a remote computing device, such as a trusted device 318 or an unknown computing device 322. When device 302 receives the interest from the remote computing device, device 302 collects contextual information for the remote device, such as network-addressing information, a media access control (MAC) address, a physical location (e.g., GPS coordinates or a location name), etc. Device 302 uses this contextual information to update a behavior profile for the remote device, to account for the remote device's data-access behavior, network-usage behavior, activity times, etc.

Device 302 processes the collected contextual information and/or behavior profiles using policies 312 to determine whether the remote device is within a protected space. For example, the policy for a company's protected space may indicate that a requesting entity needs to provide a digital certificate that is signed by the company's certificate authority (e.g., a server within trusted network 316), and that the interest needs to be received via trusted network 316. If device 302 receives an interest from computing device 322 via a WAN 320, device 322 can determine that computing device 322 is not within the company's protected space because the interest was received via WAN 320. Hence, device 322 will block the requested data from being forwarded to computing device 322, thereby preventing the data from being leaked outside trusted network 316.

On the other hand, if device 302 receives an interest from trusted device 318 via trusted network 316 (e.g., a company's secured LAN), and device 302 receives a properly signed digital certificate from trusted device 318, device 302 can determine that trusted device 318 is within the protected space and proceeds to forward the requested data to trusted device 318. However, if device 302 receives the interest from trusted device 318 from WAN 320, device 302 will block the requested data from being forwarded to computing device 322, even though the digital certificate for trusted device 318 is valid.

Figure 4:
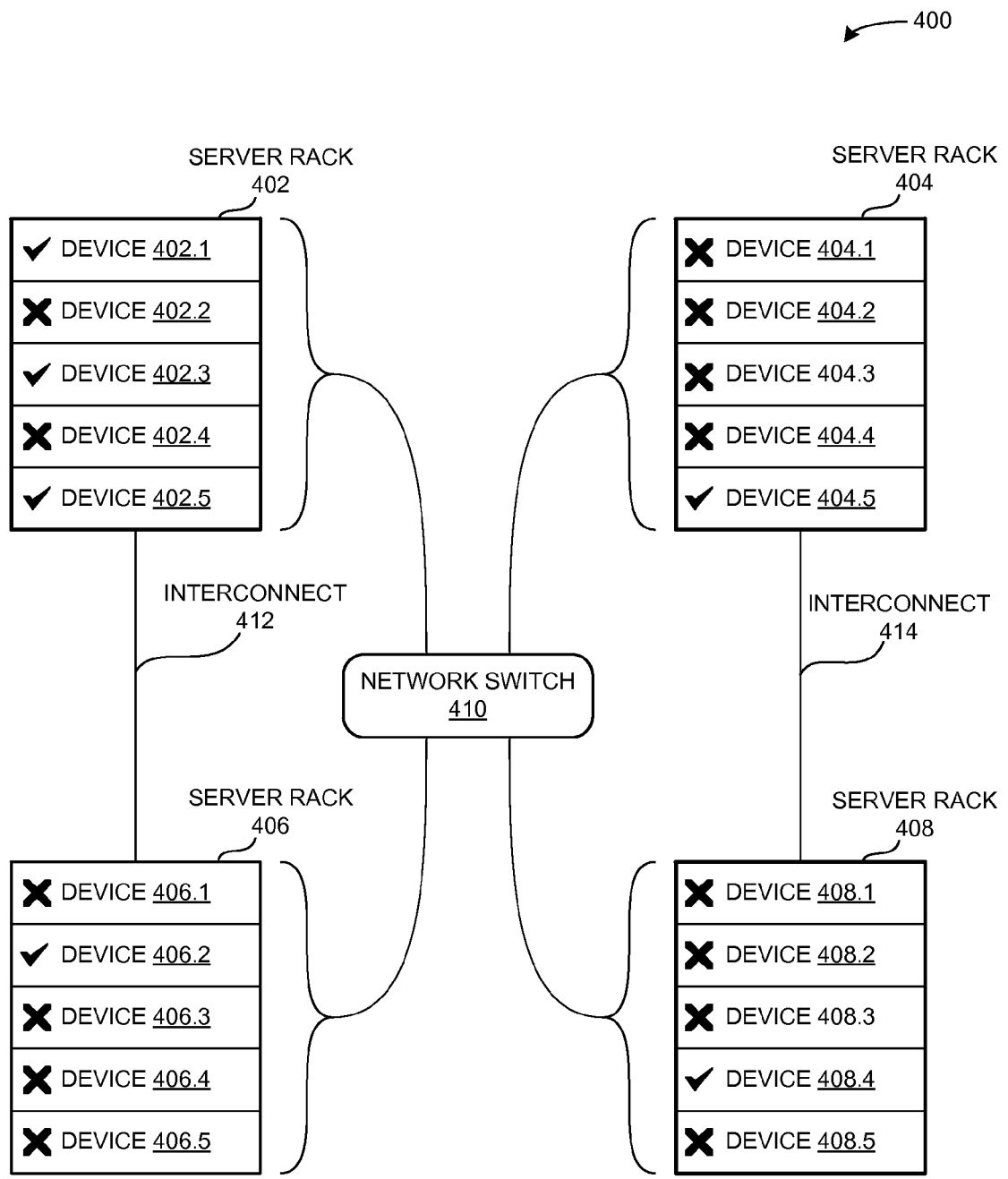
FIG. 4 presents an exemplary computer cluster environment that enforces a protected space in accordance with an embodiment.

FIG. 4 presents an exemplary computer cluster environment 400 that enforces a protected space in accordance with an embodiment. Cluster environment 400 can include a plurality of computing devices 402-408 which can communicate via a network switch 410. In some embodiments, cluster 400 can be organized into a set of server racks (e.g., server rack 402), such that the individual racks can include a set of interconnected computing devices (e.g., devices 402.1-402.5).

For example, a computer cluster for cloud computing (e.g., Amazon Web Services, provided by Amazon.com, Inc. of Seattle, Wash.) can include a plurality of server racks distributed across various global locations. A software developer can lease a set of computing nodes of the computer cluster, and/or can lease virtual machines that run on a set of computing nodes and share resources with other virtual machines on these computing nodes. In either case, the software developer can configure the leased computing nodes to enforce filters and/or policies that prevent protected data from being forwarded to an untrusted entity.

If the developer leases a complete computing node (e.g., device 402.1), the developer can configure the computing node to implement a trusted device by including only software applications that are allowed to access protected data. Hence, the policies in this computing node can allow all local software applications to access the protected data. On the other hand, if the developer leases a virtual machine from a computing node (e.g., device 402.3), the developer can configure this computing node's virtual machine to realize a trusted device. However, because the computing node can host multiple virtual machines for various end users, the developer creates policies for the trusted virtual machine that allows the virtual machine's software environment to access the protected data, and prevents other virtual machines on the same computing node from accessing the protected data.

For example, the developer can lease a physical server or a virtual machine on devices 402.1, 402.3 402.5 of server rack 402, device 404.5 of server rack 404, device 406.2 of server rack 406, and device 408.4 of server rack 408. The developer can configure network interfaces between the leased physical servers and virtual machines, and deploys filters and/or policies to realize the protected space that safeguards the developer's protected data. Then, when a physical server or virtual machine (e.g., device 402.3) receives an interest from a requesting entity (e.g., device 408.2), the server or machine can use the filters and policies to determine whether to forward the requested data to the requesting entity. If the requesting entity is not within the developer's protected space, the developer's machine can block the requested data from being forwarded to the requesting entity.

In some embodiments, the developer can provision various computing nodes and/or virtual machines from throughout cluster environment 400 to work together and function as a single system. This configuration can include a complex set of interfaces that interconnect the various computing nodes, such as network switch 410 and local interconnects 412 and 414. For example, server racks 402 and 406 may be housed in the same building, and the computing nodes within server racks 402 and 406 can communicate with each other via a local interconnect 412 such as a LAN. Similarly, computing nodes within server racks 404 and 408 can also be within the same building, and can communicate with each other via local interconnect 414.

The developer can also install and provision one or more software entities of a respective computing node to access protected data from one or more namespaces. For example, the policy can allow a virtual machine that is instantiated on one or more computing nodes to access protected data for a namespace "/PARC/cloud/vm_config." Also, for two independent software applications named "Alpha" and "Beta" that run within the virtual machine instances, the policy can allow application "Alpha" to access protected data from namespace "/PARC/cloud/Alpha," and can allow application "Beta" to access protected data from namespace "/PARC/cloud/Beta."

Once the developer has created the filters and policies for computer cluster 400, the user can deploy these filters and policies onto the leased computing nodes and virtual machines to safeguard the protected data throughout computer cluster 400. Hence, the developer's computing nodes and virtual machines can use these filters and policies to safely communicate data with each other, while preventing protected data from being forwarded to other computing nodes and/or virtual machines within cluster 400. For example, a malicious user may attempt to gain access to protected data from the developer's virtual machine on device 402.3 by leasing his own virtual machine on device 402.3. However, if the malicious user's virtual machine sends interests for protected data to the developer's virtual machine, the developer's virtual machine will recognize that the developer's virtual machine is not a trusted software environment. The developer's virtual machine will block the protected data from being forwarded to the malicious user's virtual machine, even when both virtual machines reside on the same computing device.

In some embodiments, a system administrator can manually create a filter to include a set of namespaces that are not to be communicated to an untrusted entity. The system administrator can also manually create a policy, based on desirable contexts, for determining whether a requesting entity is within a protected space based on the entity's context. In some other embodiments, one or more computing nodes of a computer cluster can automatically generate the policy by auto-discovering the system administrator's cluster topology, and creating a plurality of rules that prevents protected data from being forwarded to entities that do not belong to the cluster topology.

Figure 5:
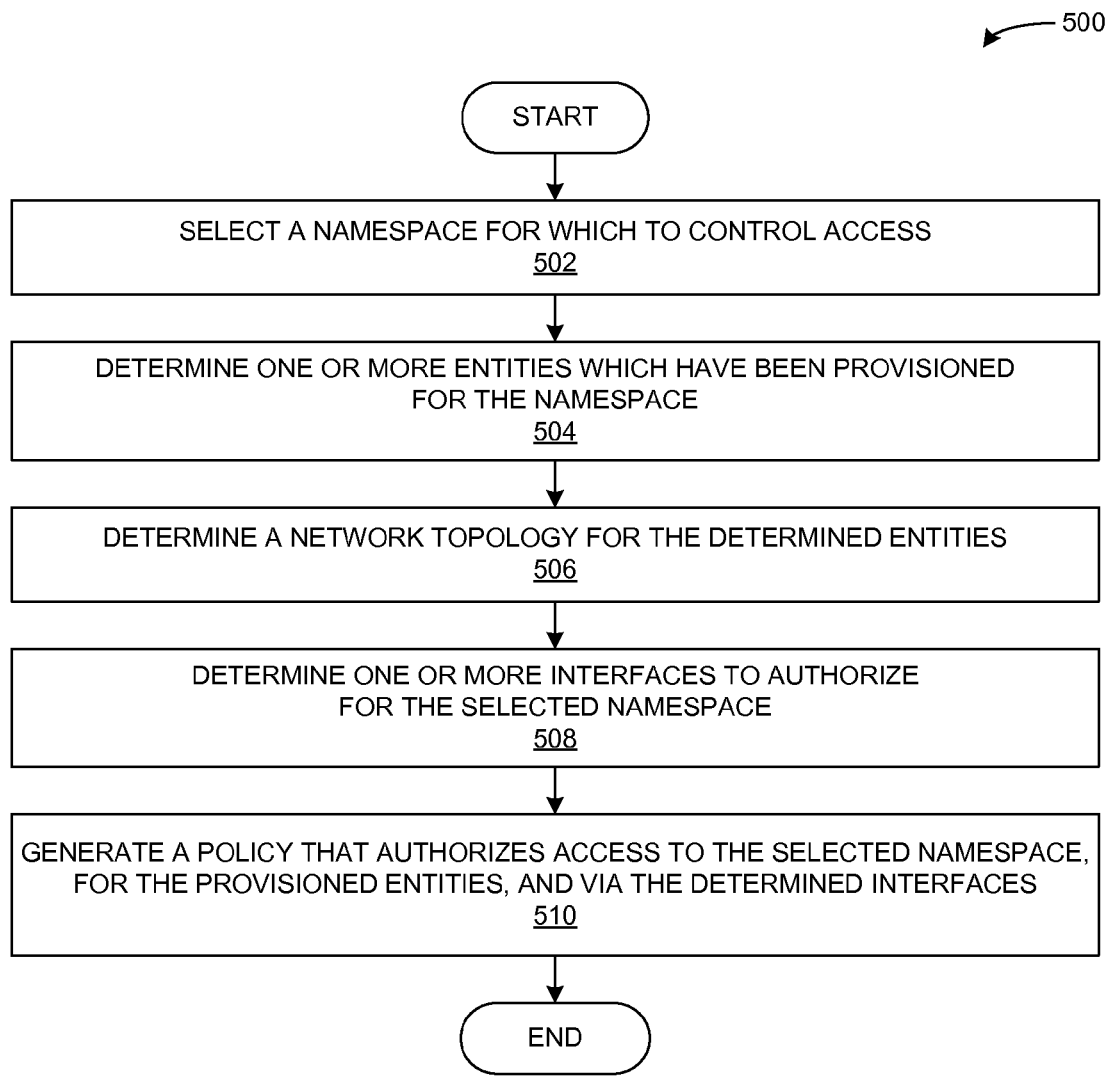
FIG. 5 presents a flow chart illustrating a method for automatically generating a policy for a protected space in accordance with an embodiment.

FIG. 5 presents a flow chart illustrating a method 500 for automatically generating a policy for a protected space in accordance with an embodiment. During operation, the system can select a namespace for which to control access (operation 502). The system then determines one or more entities which have been provisioned for the protected space (operation 504), and determines a network topology for the determined entities (operation 506). These entities can include a computing device, a virtual machine within a computing device, and/or a software application executed by a computing device or virtual machine.

The system then determines one or more interfaces to authorize for the selected namespace (operation 508), and generates a policy that authorizes access to the selected namespace, for the provisioned entities, and via the determined interfaces (operation 510). A system administrator can deploy the policy across the servers and/or virtual machines associated with the namespace to realize a protected space.

Figure 6:
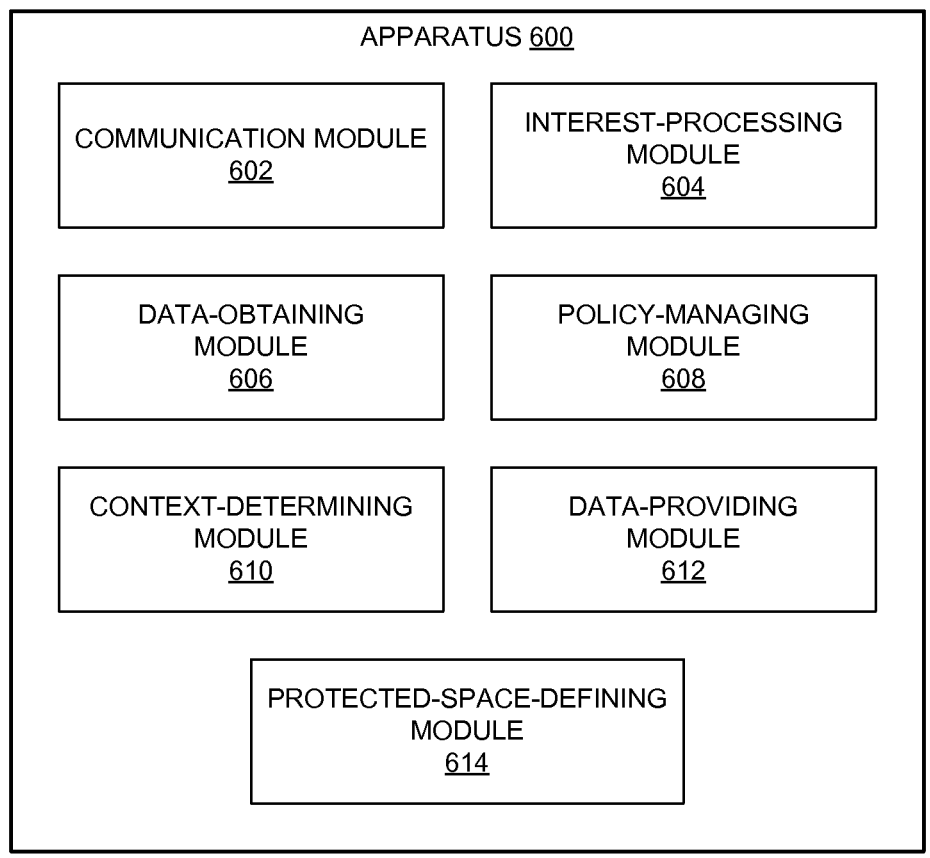
FIG. 6 illustrates an exemplary apparatus that facilitates securing data within a protected space in accordance with an embodiment.

FIG. 6 illustrates an exemplary apparatus 600 that facilitates securing data within a protected space in accordance with an embodiment. Apparatus 600 can comprise a plurality of modules which may communicate with one another via a wired or wireless communication channel. Apparatus 600 may be realized using one or more integrated circuits, and may include fewer or more modules than those shown in FIG. 6. Further, apparatus 600 may be integrated in a computer system, or realized as a separate device which is capable of communicating with other computer systems and/or devices. Specifically, apparatus 600 can comprise a communication module 602, an interest-processing module 604, a data-obtaining module 606, a policy-managing module 608, a context-determining module 610, a data-providing module 612, and a protected-space-defining module 614.

In some embodiments, communication module 602 can receive and/or send interests or data. Interest-processing module 604 can obtain an interest from a requesting entity. The interest can include a location-independent structured name associated with a request for data. Data-obtaining module 606 can obtain the data associated with the location-independent structured name, and policy-managing module 608 can obtain a policy associated with the data.

Context-determining module 610 can determine a context for the interest, and data-providing module 612 can provide the data to the requesting entity in response to determining that the requesting entity is within the protected space. Protected-space-defining module can generate a policy for authorizing or denying access to a namespace of a protected space.

Figure 7:
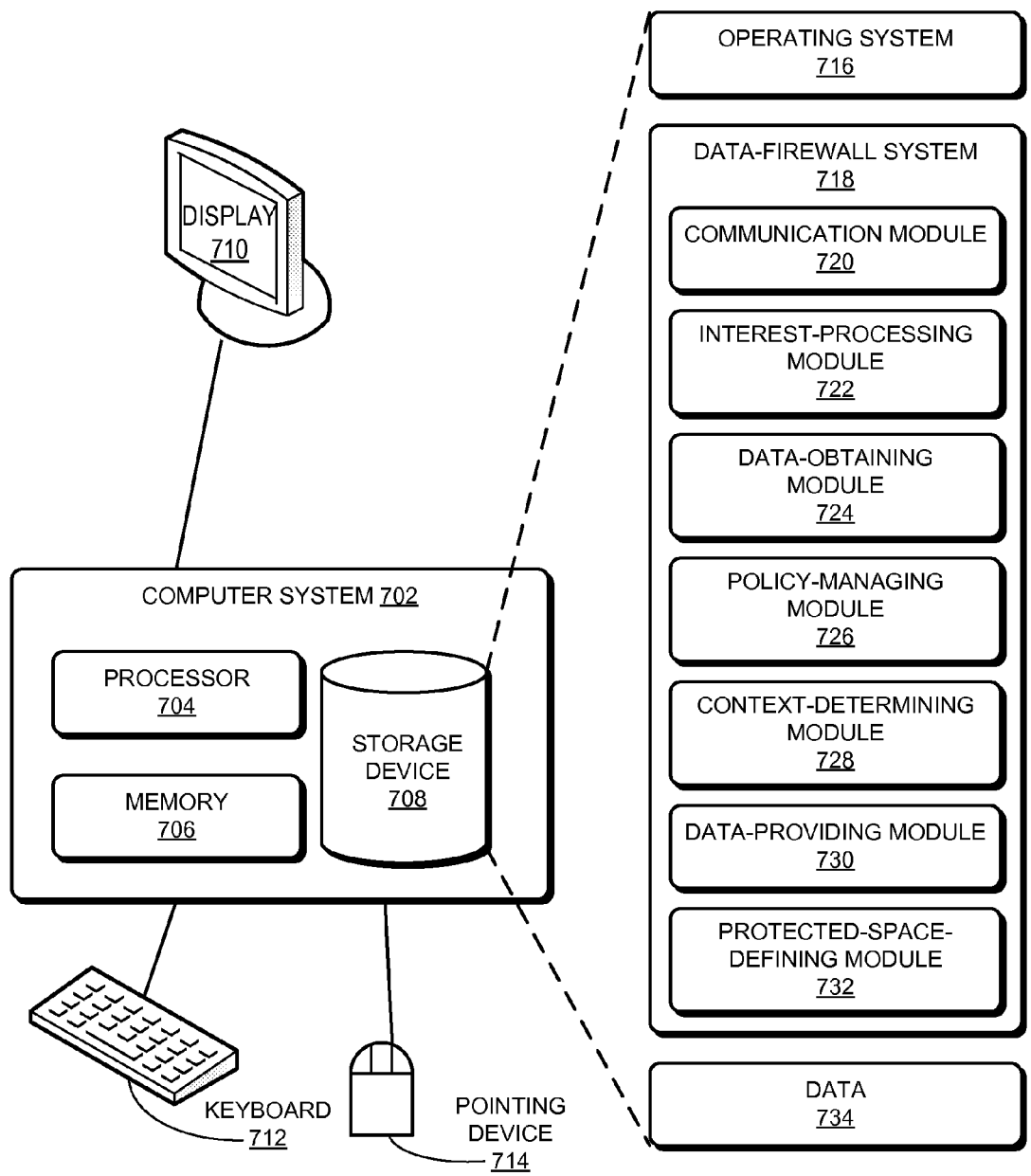
FIG. 7 illustrates an exemplary computer system that facilitates securing data within a protected space in accordance with an embodiment.

FIG. 7 illustrates an exemplary computer system 702 that facilitates securing data within a protected space in accordance with an embodiment. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a data-firewall system 718, and data 726.

Data-firewall system 718 can include instructions, which when executed by computer system 702, can cause computer system 702 to perform methods and/or processes described in this disclosure. Specifically, data-firewall system 718 may include instructions for receiving and/or sending interests or data (communication module 720). Further, data-firewall system 718 can include instructions for obtaining an interest from a requesting entity (interest-processing module 722). The interest can include a location-independent structured name associated with a request for data. Data-firewall system 718 can also include instructions for obtaining the data associated with the location-independent structured name (data-obtaining module 724).

Data-firewall system 718 can also include instructions for obtaining a policy associated with the data (policy-managing module 726), and can include instructions for determining a context for the interest (context-determining module 728). Data-firewall system 718 can include instructions for providing the data to the requesting entity in response to determining that the requesting entity is within the protected space (data-providing module 730). Data-firewall system 718 can also include instructions for generating a policy for authorizing or denying access to a namespace of a protected space (protected-space-defining module 732).

Data 726 can include any data that is required as input or that is generated as output by the methods and/or processes described in this disclosure. Specifically, data 726 can store at least one or more data collections, interests, policies for the data collections, behavior profiles for one or more requesting entities, etc.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   obtaining an interest, by a computing device from a requesting entity over a content centric network, wherein the interest includes a location-independent structured name associated with a request for data;
   obtaining the data associated with the location-independent structured name;
   obtaining a policy associated with the data's location-independent structured name or name prefix;
   determining a context for the interest;
   determining whether the requesting entity is within a protected space for the obtained data as determined based on the policy and the context, wherein the protected space includes at least an application which is not suspect of having been compromised by an illegitimate user or software, and wherein determining that the requesting entity is within the protected space involves determining that a recent behavior profile for the requesting entity, as determined based in part on the context, is substantially similar to a previous behavior profile for the requesting entity; and
   responsive to determining that the requesting entity is within the protected space, forwarding the data to the requesting entity over the content centric network.

2. The method 1, wherein the requesting entity includes one or more of:
   a computing node of a computer cluster;
   a computing device of an Enterprise environment; and
   a software application executed by a computing device.

3. The method of claim 1, further comprising:
   responsive to determining that the requesting entity is not within the protected space, requesting for an authorization from the requesting entity.

4. The method of claim 1, further comprising:
   responsive to determining that the interest is associated with a blacklisted namespace, blocking the data from being forwarded to the requesting entity.

5. The method of claim 1, wherein determining that the requesting entity is within a protected space involves one or more of:
   determining that the requesting entity is a trusted computing device;
   determining that the requesting entity is a trusted software application;
   determining that the requesting entity is coupled to a trusted computer network; and
   determining that the context satisfies the policy's rules.

6. The method of claim 1, further comprising:
   selecting a namespace for which to control access;
   determining one or more entities which have been provisioned for the namespace;
   determining a network topology for the determined entities;
   determining one or more interfaces to authorize for the selected namespace; and
   generating a policy which authorizes access to the selected namespace, for the provisioned entities, and via the determined interfaces.

7. The method of claim 1, wherein the context includes one or more of:
   a hardware identifier;
   a network address;
   a biometric measurement;
   a location identifier;
   a location trace;
   a user behavior;
   a network behavior; and
   an interest-related behavior.

8. The method of claim 1, wherein obtaining the data associated with the location-independent structured name involves one or more of:
   obtaining the data from a local repository; and
   forwarding the interest to a remote computing device based on the location-independent structured name.

9. A non-transitory computer-readable storage medium storing instructions that when executed by a computer cause the computer to perform a method, the method comprising:
   obtaining an interest, from a requesting entity over a content centric network, wherein the interest includes a location-independent structured name associated with a request for data;

obtaining the data associated with the location-independent structured name;
obtaining a policy associated with the data's location-independent structured name or name prefix;
determining a context for the interest;
determining whether the requesting entity is within a protected space for the obtained data as determined based on the policy and the context, wherein the protected space includes at least an application which is not suspect of having been compromised by an illegitimate user or software, and wherein determining that the requesting entity is within the protected space involves determining that a recent behavior profile for the requesting entity, as determined based in part on the context, is substantially similar to a previous behavior profile for the requesting entity; and
responsive to determining that the requesting entity is within the protected space, forwarding the data to the requesting entity over the content centric network.

10. The storage medium 9, wherein the requesting entity includes one or more of:
a computing node of a computer cluster;
a computing device of an Enterprise environment; and
a software application executed by a computing device.

11. The storage medium of claim 9, wherein the method further comprises:
responsive to determining that the requesting entity is not within the protected space, requesting for an authorization from the requesting entity.

12. The storage medium of claim 9, wherein the method further comprises:
responsive to determining that the interest is associated with a blacklisted namespace, blocking the data from being forwarded to the requesting entity.

13. The storage medium of claim 9, wherein determining that the requesting entity is within a protected space involves one or more of:
determining that the requesting entity is a trusted computing device;
determining that the requesting entity is a trusted software application;
determining that the requesting entity is coupled to a trusted computer network; and
determining that the context satisfies the policy's rules.

14. The storage medium of claim 9, wherein the method further comprises:
selecting a namespace for which to control access;
determining one or more entities which have been provisioned for the namespace;
determining a network topology for the determined entities;
determining one or more interfaces to authorize for the selected namespace; and
generating a policy which authorizes access to the selected namespace, for the provisioned entities, and via the determined interfaces.

15. The storage medium of claim 9, wherein the context includes one or more of:
a hardware identifier;
a network address;
a biometric measurement;
a location identifier;
a location trace;
a user behavior;
a network behavior; and
an interest-related behavior.

16. The storage medium of claim 9, wherein obtaining the data associated with the location-independent structured name involves one or more of:
obtaining the data from a local repository; and
forwarding the interest to a remote computing device based on the location-independent structured name.

17. An apparatus, comprising:
an interest-processing module configured to obtain an interest from a requesting entity over a content centric network, wherein the interest includes a location-independent structured name associated with a request for data;
a data-obtaining module to obtain the data associated with the location-independent structured name;
a policy-managing module to obtain a policy associated with the data's location-independent structured name or name prefix;
a context-determining module to determine a context for the interest; and
a data-providing module to:
determine whether the requesting entity is within a protected space for the obtained data, as determined based on the policy and the context, wherein the protected space includes at least an application which is not suspect of having been compromised by an illegitimate user or software, and wherein determining that the requesting entity is within the protected space involves determining that a recent behavior profile for the requesting entity, as determined based in part on the context, is substantially similar to a previous behavior profile for the requesting entity;
responsive to determining that the requesting entity is within the protected space, provide the data to the requesting entity over the content centric network.

18. The apparatus 17, wherein the requesting entity includes one or more of:
a computing node of a computer cluster;
a computing device of an Enterprise environment; and
a software application executed by a computing device.

19. The apparatus of claim 17, wherein the data-providing module is further configured to:
responsive to determining that the requesting entity is not within the protected space, requesting for an authorization from the requesting entity.

20. The apparatus of claim 17, wherein the data-providing module is further configured to:
determine whether the interest is associated with a blacklisted namespace; and
responsive to determining that the interest is associated with a blacklisted namespace, blocking the data from being forwarded to the requesting entity.

21. The apparatus of claim 17, wherein determining that the requesting entity is within the protected space involves one or more of:
determining that the requesting entity is a trusted computing device;
determining that the requesting entity is a trusted software application;
determining that the requesting entity is coupled to a trusted computer network; and
determining that the context satisfies the policy's rules.

22. The apparatus of claim 17, further comprising a protected-space-defining module to:
select a namespace for which to control access;
determine one or more entities which have been provisioned for the namespace;
determine a network topology for the determined entities;

determine one or more interfaces to authorize for the selected namespace; and generate a policy which authorizes access to the selected namespace, for the provisioned entities, and via the determined interfaces.

23. The apparatus of claim 17, wherein the context includes one or more of:
- a hardware identifier;
- a network address;
- a biometric measurement;
- a location identifier;
- a location trace;
- a user behavior;
- a network behavior; and
- an interest-related behavior.

24. The apparatus of claim 17, wherein while obtaining the data associated with the location-independent structured name, the data-obtaining module is further configured to:
- obtain the data from a local repository; or
- forward the interest to a remote computing device based on the location-independent structured name.

* * * * *